US012695703B2

(12) United States Patent
Chae et al.

(10) Patent No.: US 12,695,703 B2
(45) Date of Patent: Jul. 28, 2026

(54) TOE-BASED NETWORK INTERFACE DEVICE, SERVER DEVICE AND OPERATING METHOD OF SERVER DEVICE CAPABLE OF ENHANCING DATA PROCESSING EFFICIENCY

(71) Applicant: MangoBoost Inc., Seoul (KR)

(72) Inventors: Dongju Chae, Seoul (KR); Junehyuk Boo, Seoul (KR); Yujin Chung, Seoul (KR)

(73) Assignee: MangoBoost Inc., Seoul (KR)

( * ) Notice: Subject to any disclaimer, the term of this patent is extended or adjusted under 35 U.S.C. 154(b) by 4 days.

(21) Appl. No.: 18/673,338

(22) Filed: May 24, 2024

(65) Prior Publication Data

US 2024/0396842 A1 Nov. 28, 2024

(30) Foreign Application Priority Data

May 26, 2023 (KR) ......................... 10-2023-0068677
Apr. 30, 2024 (KR) ......................... 10-2024-0058182

(51) Int. Cl.
*H04L 47/193* (2022.01)
*H04L 47/125* (2022.01)
(52) U.S. Cl.
CPC .......... *H04L 47/193* (2013.01); *H04L 47/125* (2013.01)
(58) Field of Classification Search
CPC ............................ H04L 47/193; H04L 47/125
See application file for complete search history.

(56) References Cited

U.S. PATENT DOCUMENTS 10,320,918 B1 * 6/2019 Blott ..................... H04L 69/161
11,902,404 B1 * 2/2024 Arora ................... H04L 43/026

2005/0122986 A1 * 6/2005 Starr ..................... H04L 69/161
370/389
2008/0198781 A1 * 8/2008 Rajakarunanayake ......................
H04L 12/2856
370/310
2024/0129253 A1 * 4/2024 Kugler ................... H04L 47/31

FOREIGN PATENT DOCUMENTS

KR 10-0653178 B1 12/2006

OTHER PUBLICATIONS

Mario Ruiz et al., Limago: an FPG-based Open-Source 100 GbE TCP/IP Stack, 2019 29th International Conference on Field Programmable Logic and Applications (FPL), Barcelona, Sep. 2019.
Mina TahmasbiArashloo et al., Enabling Programmable Transport Protocols in High-Speed NICs, 17th USENIX Symposium on Networked Systems Design and Implementation (NSDI '20), Santa Clara, CA, USA, Feb. 25, 2020.
Rajath Shashidhara et al., FlexTOE: Flexible TCP Offload with Fine-Grained Parallelism, Mar. 13, 2022.

* cited by examiner

*Primary Examiner* — Farzana B Huq
(74) *Attorney, Agent, or Firm* — NKL LAW; Jae Youn Kim

(57) ABSTRACT

A server device includes: a server device may include a host device configured to hook a control command and a data command to a TCP/IP Offload Engine (TOE) library, process the control command through a first path, and process the dada command through a second path that is different from the first path and shares information for a TCP session with the first path; and a TOE-based network interface device configured to receive the control command and the data command, and generate a TCP packet by performing a TCP operation.

15 Claims, 7 Drawing Sheets

100

Host Device (120)

Application ⎯121

TOE Library ⎯122

Remote Device
200

PH2 ⎯ DCM CCM ⎯ PH1

NETWORK

Network Interface Device ⎯140

TCP Session Table (TTB)

| SID | State | TX_APP | TX_ACK | RX_APP | RX_RCV |
|-----|-------|--------|--------|--------|--------|
| 1 | Ready | 0×2000 | 0×1000 | 0×2100 | 0×2100 |
| 2 | Closed | | | | |
| 3 | Ready | 0×3000 | 0×3000 | 0×1500 | 0×2300 |
| ⋮ | | | | | |

FIG. 7

TOE-BASED NETWORK INTERFACE DEVICE, SERVER DEVICE AND OPERATING METHOD OF SERVER DEVICE CAPABLE OF ENHANCING DATA PROCESSING EFFICIENCY

CROSS-REFERENCE TO RELATED APPLICATION(S)

This application claims benefit of priority to Korean Patent Application Nos. 10-2023-0068677, filed on May 26, 2023, and 10-2024-0058182, filed on Apr. 30, 2024, in the Korean Intellectual Property Office, the disclosures of which are incorporated herein by reference in their entirety.

BACKGROUND

The present disclosure relates to a network interface, more specifically, relates to a TCP/IP Offload Engine (TOE) based network interface device, a server device and an operating method of a server device capable of enhancing data processing efficiency.

The application of big data or artificial intelligence is expanding and the use of over-the-top (OTT) services becomes almost routine. As a result, there is an urgent need to improve the performance of various devices connected through the network, such as user terminals, web servers, web application servers (WAS), storage servers, and database servers, in terms of data processing volume and processing speed.

Specifically, network devices may require enormous system resources to perform data communication based on the Transmission Control Protocol/Internet Protocol (TCP/IP) Protocol in a high-speed network environment. For example, when a web server performs data communication with a large number of user terminals over a network, the web server's central processing unit (CPU) may experience a significant load to perform TCP/IP operations. This may cause performance degradation and communication delays throughout the web server.

Thus, various technologies have emerged to distribute the load of the CPU on network devices, among which the TCP/IP Offload Engine (TOE) technology is a technology that offloads the CPU load by implementing the transport layer and network layer, which were previously implemented in software in TCP/IP, as separate hardware (e.g., Network Interface Card). TOE technology to implement high-speed network environments requires efficient and flexible hardware or software design, such as high performance and multiple connection support.

SUMMARY

The present disclosure is intended to provide a high-performance TOE-based network interface device, a server device and an operating method of a server device capable of enhancing data processing efficiency by efficiently controlling and utilizing hardware or software in a high-speed network environment.

According to an example embodiment of the present disclosure, a server device includes: a server device may include a host device configured to hook a control command and a data command to a TCP/IP Offload Engine (TOE) library, process the control command through a first path, and process the dada command through a second path that is different from the first path and shares information for a TCP session with the first path; and a TOE-based network interface device configured to receive the control command and the data command, and generate a TCP packet by performing a TCP operation.

According to an example embodiment of the present disclosure, a TOE-based network interface device is configured to receive the control command and the data command, and generate a TCP packet by performing a TCP operation.

According to an example embodiment of the present disclosure, an operating method of a server device includes: hooking a control command and a data command, by a TOE library of the server device; processing the control command through a first path, by a host processor of the server device; processing the data command through a second path that is different from the first path and shares information for a TCP session with the first path, by the host processor; and receiving the control command and the data command, and generating a TCP packet through performing a TCP operation, by a TOE-based network interface device.

According to an example embodiment of the present disclosure, a TOE-based network interface device, a server device and an operating method of a server device, the efficiency of data processing can be improved by allocating different resources and performing optimized control based on the characteristics of TCP operation.

Alternatively, according to an example embodiment of the present disclosure, a TOE-based network interface device, a server device and an operating method of a server device, memory usage in the network interface device can be significantly reduced and the efficiency of data processing can be improved as TCP data is buffered in a host device and is not additionally buffered or copied within the network interface device.

The effects of the exemplary embodiments of the present disclosure are not limited to those described above, and other effects not described may be clearly derived and understood by persons of ordinary skill in the art to which the exemplary embodiments of the present disclosure belong from the following description. In other words, unintended effects of implementing the exemplary embodiments of the present disclosure may also be derived from the exemplary embodiments of the present disclosure by persons of ordinary skill in the art.

BRIEF DESCRIPTION OF THE DRAWINGS

FIG. 7 is a diagram illustrating a TCP session table, according to an example embodiment of the present disclosure;

DETAILED DESCRIPTION

Figure 1:
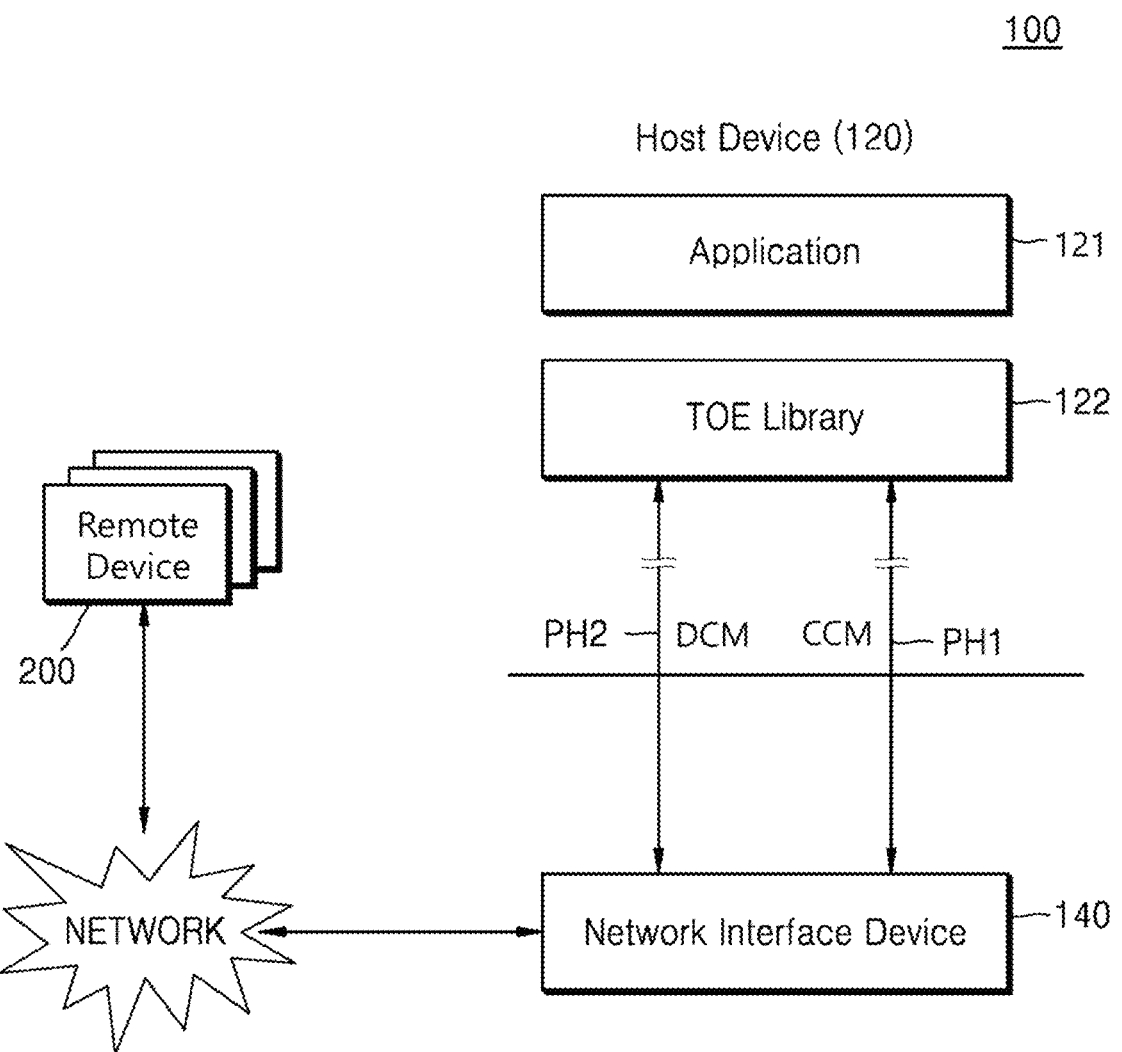
FIG. 1 is a diagram illustrating a server device, according to an example embodiment of the present disclosure.

Hereinafter, embodiments of the present disclosure will be described in detail with reference to the drawings so that those skilled in the art to which the present disclosure pertains can easily practice the invention. However, the present disclosure may be implemented in various forms and is not limited to the example embodiments described herein. In relation to the description of the drawings, like or similar reference numerals may be used for like or similar components. Moreover, in the drawings and the related description, well-known functions and configurations may be omitted for clarity and conciseness.

FIG. 1 is a diagram illustrating a server device, according to an example embodiment of the present disclosure.

Referring to FIG. 1, according to an example embodiment of the present disclosure, a server device 100 and a remote device 200 may be connected in a TCP session over a network to perform communication. The TCP session may mean a communication path between the server device 100 and the remote device 200 that is connected through a network, which may be specified by an IP address and port number and identified by a flow ID. In the present disclosure, the TCP session may be understood as the same meaning as a TCP connection.

In an example embodiment of the present disclosure, the server device 100 may include a host device 120 and a TOE-based network interface device 140, and efficiently perform TCP operations for the above-described communication by allocating different resources and performing optimized control based on a first path PH1 and a second path PH2, or by directly processing data stored in the host device 120 without an additional internal buffer in the network interface device 140.

In an example embodiment of the present disclosure, the first path PH1 may be a path formed between the host device 120 and the network interface device 140 for processing commands that control a TCP connection, representing the connection of resources used in this processing or operations performed for it. According to an example embodiment, the commands for controlling the TCP connection may include "socket( )" for creating a socket, "bind( )" for associating a created socket with an IP address, "listen( )" for monitoring a TCP connection request from the remote device 200, "connect( )" for requesting a TCP connection, "accept( )" for accepting a received TCP connection request, and "close( )" for closing a TCP connection.

The second path PH2 may be a path formed between the host device 120 and the network interface device 140 for processing commands that transmit and receive data via a TCP connection, representing the connection of resources used in this processing or operations performed for it. According to an example embodiment, the commands for transmitting and receiving data via the TCP connection may include "send( )" for sending data and "recv( )" for receiving data, and so on.

Hereinafter, the command for controlling the TCP connection may be referred to as a control command CCM, and the command for transmitting and receiving data through the TCP connection may be referred to as a data command DCM. In the present disclosure, the term "command" may be understood as synonymous with "request", "socket API (Application Programming Interface)", "event", and "function".

Although not illustrated, a host CPU (Central Processing Unit) of the host device 120 according to an example embodiment of the present disclosure may perform overall control of the processing of the control command CCM and the data command DCM within the host device 120.

The host device (120) according to an example embodiment of the present disclosure may support the execution of the TCP operations in the TOE-based network interface device 140 without modifying the source code of an application 121 or applying OS (Operating System) patches to the host device 120. For this purpose, the host device 120 may include a TOE library 122.

The TOE library 122 may hook a socket API from the application 121. The socket API may be referred to as the control command CCM or the data command DCM.

The TOE library 122 may include functions, parameters, and subroutines that enable the processing of requests from the application 121 related to communication with the remote device 200 in the TOE-based network interface device 140. For example, through the variable 'LD_PRE-LOAD', which allows dynamic calling with priority, the control command CCM or the data command DCM may be transferred to the TOE library 122.

The control command CCM or the data command DCM passed to the TOE library 122 may be processed differently in the TOE-based network interface device 140 depending on whether they are related to a command for a TOE socket. When they are the command for the TOE socket, the host device 120 may process the control command CCM through the first path PH1 and the data command DCM through the second path PH2.

Figure 2:
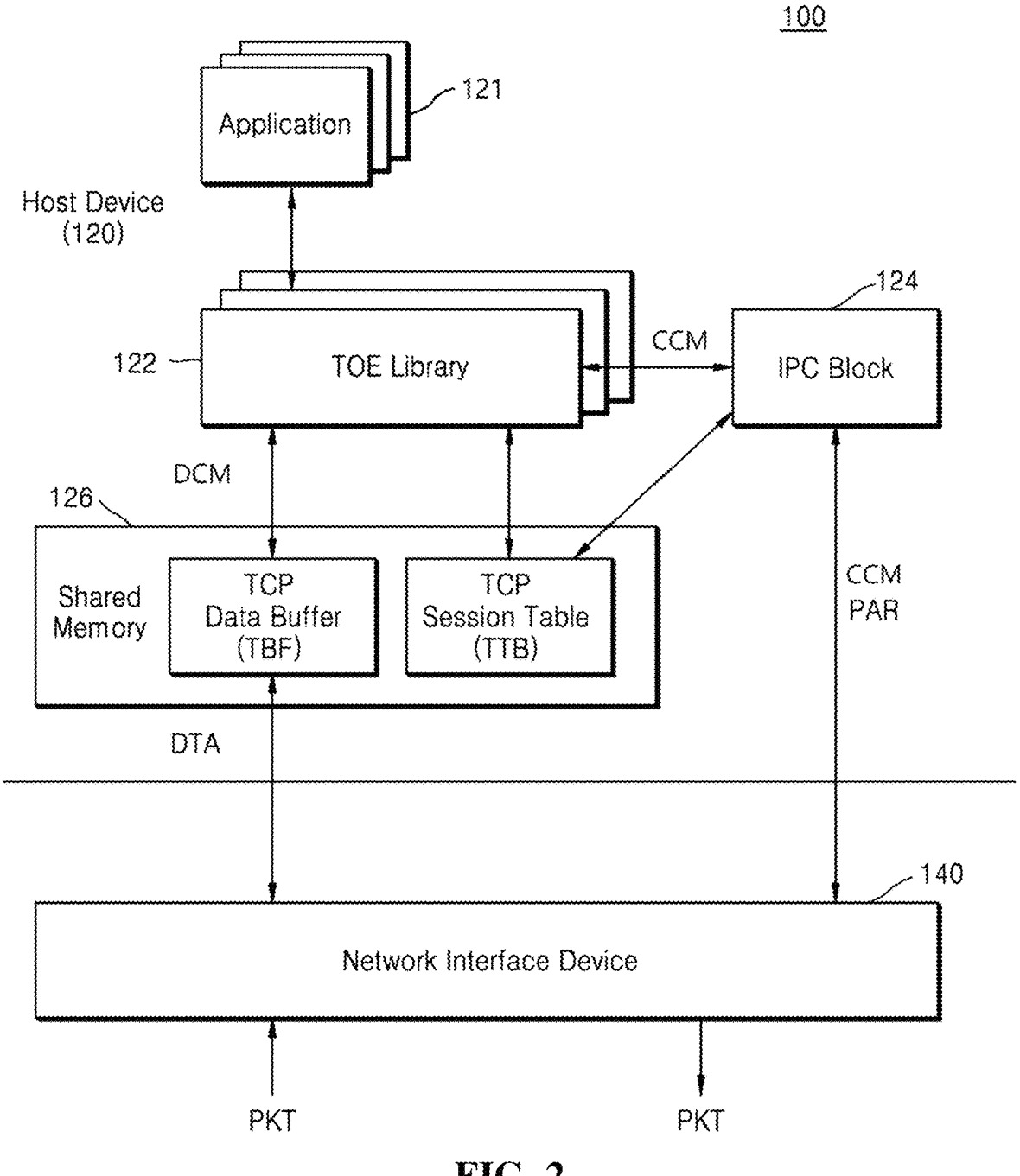
FIG. 2 is a diagram illustrating a server device in more detail, according to an example embodiment of the present disclosure.

FIG. 2 is a diagram illustrating a server device 100 in more detail, according to an example embodiment of the present disclosure.

Referring to FIGS. 1 and 2, the host device 100 according to an example embodiment of the present disclosure may further include an IPC block (Inter-Process Communication block) 124 and a shared memory 126. In this case, the first path PH1 that processes the control command CCM to be transmitted by the host device 120 may include the IPC block 124. The IPC block 124 may be a software block that manages communication between the host device 120 and the network interface device 140. For example, the IPC block 124 may perform tasks such as buffer allocation and management for communication between the host device 120 and the network interface device 140.

Figure 3:
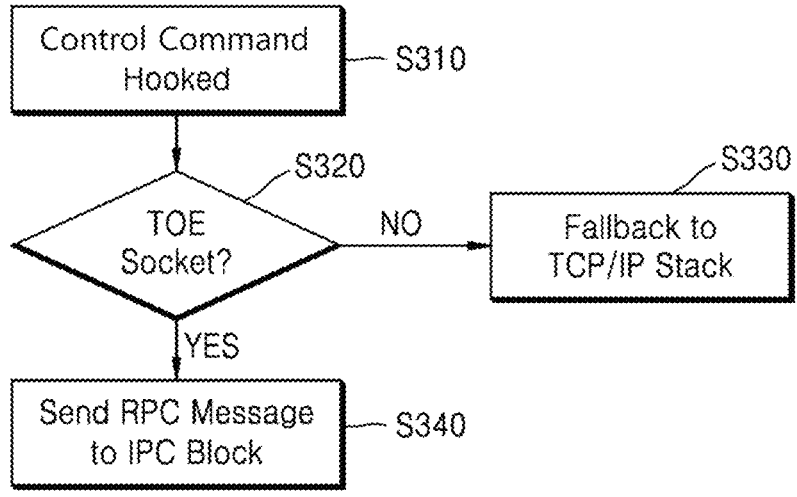
FIGS. 3 and 4 are flowcharts illustrating a process of handling a control command in a host device, respectively, according to an example embodiment of the present disclosure.
Figure 4:
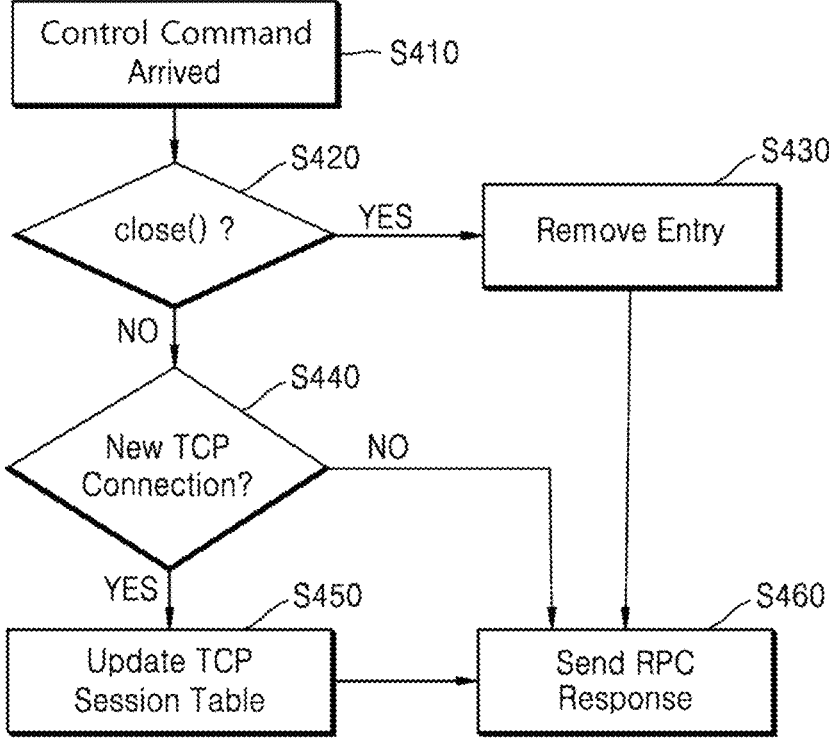

FIGS. 3 and 4 are flowcharts illustrating a process of handling a control command CCM in a host device 120, respectively, according to an example embodiment of the present disclosure.

First, referring to FIGS. 2 and 3, when the control command CCM is hooked and received to the TOE library 122 according to an example embodiment of the present disclosure (S310), it may be determined whether this command is for a TOE socket (S320). For example, whether it is a command for the TOE socket may be determined by checking the file descriptor, which is one of the parameters PAR of the control command CCM. For instance, the file descriptor may be set to different values depending on whether the control command CCM is related to a TOE socket, a TCP socket, or a UDP socket. For example, the file descriptor may be set to "1" for the TOE socket, to "2" for the TCP socket, and to "3" for the UDP socket. The TOE library 122 may store information about the file descriptor in a table format.

When the control command CCM is not for the TOE socket ("No" in S320), that is, when TCP operations are not processed by the TOE-based network interface device 140, the control command CCM may be processed as fallback to the TCP stack on the kernel of the host device 120 (S330). When the control command CCM is a command for the TOE socket ("Yes" in S320), the control command CCM may be transmitted to the IPC block 124 in the form of an RPC message (Remote Procedure Call message) from the TOE library 122 (S340). Therefore, a plurality of the control commands CCM related to a plurality of the TCP connections requested by a plurality of the applications 121 may be processed sequentially without synchronization issues. However, it is not limited thereto, other transmission methods may also be adopted as needed.

Next, referring to FIGS. 2 and 4, when the IPC block 124 according to an example embodiment of the present disclosure receives the control command CCM in the form of the RPC message from the TOE library 122 (S410), it may check whether the control command CCM is "close( )" (S330). When the control command CCM is "close( )" ("Yes" in S420), the entry for the corresponding TCP session in the TCP session table TTB may be deleted (S430).

When the control command CCM is not "close( )" ("No" in S420), it may be checked whether the control command CCM is for a new TCP session (S440). For example, when the control command CCM is "connect( )" or "accept( )", the TCP session table TTB may be updated (S450). For example, an entry for a new TCP session may be allocated in the TCP session table TTB. The TCP session table TTB will be described in detail below. When the control command CCM is not for a new TCP session ("No" in S440) or processing for the TCP session table TTB is completed (S430, S450), the IPC block 124 may transmit an RPC response to the TOE library 122 (S460).

In this manner, after the TCP session is established, the IPC block 124 may periodically check the state of the TCP session and update the state of the changed TCP session in the TCP session table TTB based on information related to the control command CCM newly transmitted from the TOE library 122 or received from the network interface device 140.

Although not illustrated, the control command CCM, transmitted to the IPC block 124 may be delivered to the network interface device 140 through a command queue or a command ring, which are included in a huge page implemented in the host device 120.

Figure 5:
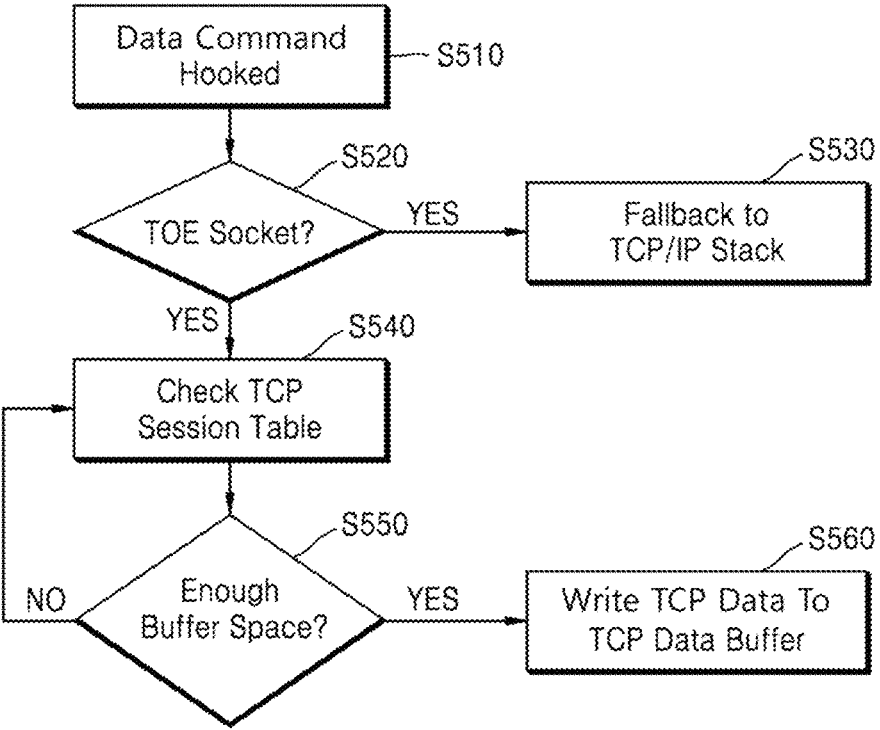
FIG. 5 is a flowchart illustrating a process of handling a data command in a host device, according to an example embodiment of the present disclosure.

FIG. 5 is a flowchart illustrating a process of handling a data command DCM in a host device 120, according to an example embodiment of the present disclosure.

Referring to FIG. 1, FIG. 2, and FIG. 5, the host device 120 may process the data command DCM to be transmitted through the second path PH2 different from the first path PH1. The data command DCM may include a parameter PAR related to the TCP data DTA. The TCP data DTA may vary in size from a single byte to several thousand bytes in accordance with the TCP protocol, where each byte may be assigned a sequence number. For example, the last sequence number of the TCP data DTA may be calculated based on the size of the data and the sequence number of the previous data.

The parameter PAR of the data command DCM may include information the TCP session such as a flow ID for identifying each TCP session, and the sequence number of the TCP data DTA, etc. The parameter PAR of the data command DCM may include information about the entire sequence number of the TCP data DTA in various ways, such as including the first and last sequence numbers of the TCP data DTA, or including the first sequence number of the TCP data DTA and the length of the TCP data DTA.

When the data command DCM is hooked (S510), the TOE library 122 may determine whether the data command DCM is for a TOE socket (S520). The determination of whether it is related to the TOE socket may be the same as the above-mentioned case of the control command CCM. Similarly, when the data command DCM is not for the TOE socket ("No" in S320), the data command DCM may be processed as fallback to the TCP stack on the kernel of the host device 120 (S530). When the data command DCM is for the TOE socket ("Yes" in S520), the host device 120 may process the data command DCM through the second path PH2.

The second path PH2 may include the shared memory 126. The shared memory 126 may be equipped as a part of DRAM, which is a host memory. For example, the aforementioned huge page may be implemented including the shared memory 126. However, this is not limited thereto, the shared memory 126 may also be equipped separately from the host memory.

In this case, the second path PH2 for the TCP data DTA of the data command DCM and the second path PH2 for the parameter PAR of the data command DCM may be different. To clearly distinguish between the second path PH2 for the TCP data DTA and the second path PH2 for the parameter PAR, the second path PH2 for the TCP data DTA is referred to as the second data path, and the second path PH2 for the parameter PAR is referred to as the second control path.

The shared memory 126 may be shared by the TOE library 122 and the IPC block 124. For example, between the TCP data buffer TBF and the TCP session table TTB included in the shared memory 126, the TCP session table TTB may be shared by the TOE library 122 and the IPC block 124.

The TCP data buffer TBF may store the TCP data DTA. The TCP data DTA may first be stored in the TCP data buffer TBF before being delivered to the network interface device 140 from the host device 120, and before being delivered to the application 121 from the network interface device 140. The TCP data DTA of the TCP data buffer TBF is stored until the command "send( )" or "recv( )" is acknowledged.

The TCP session table TTB may store information about the state of each of the TCP sessions and the state of the TCP data buffer TBF. For example, each entry of the TCP session table TTB may include information about whether the TCP session corresponding it is in a state of "Ready" or "Closed". "Ready" means the state of readiness for new events to occur in the corresponding TCP session, and "Closed" means the state of closing the corresponding TCP session. For example, the TCP session table TTB may include information about a valid area of the TCP data buffer TBF, namely information about a region where the TCP data DTA is stored in the TCP session table TTB.

The TOE library (122) may reference the TCP session table TTB to write the TCP data DTA of the data command DCM into the TCP data buffer TBF (S560). This will be described in detail below.

Figure 6:
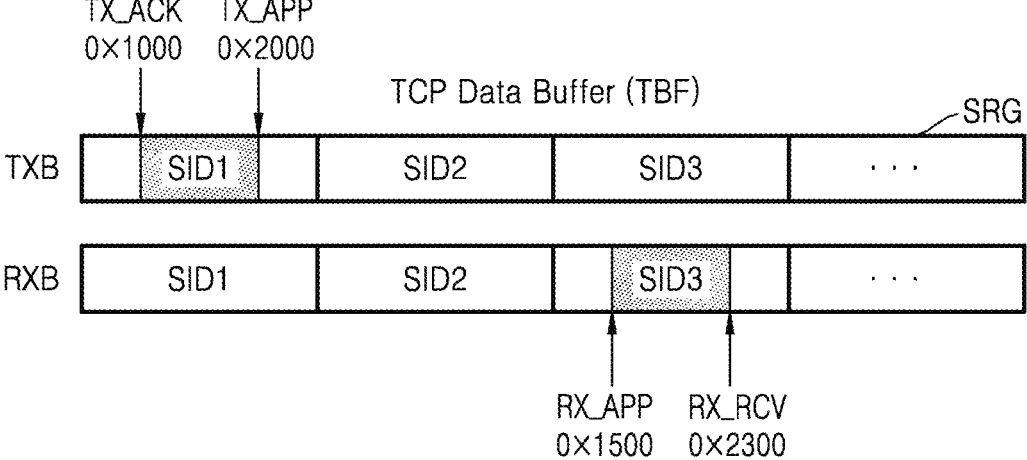
FIG. 6 is a diagram illustrating a TCP data buffer, according to embodiments of the present disclosure.

FIG. 6 is a diagram illustrating a TCP data buffer TBF according to embodiments of the present disclosure, and FIG. 7 is a diagram illustrating a TCP session table TBF according to an example embodiment of the present disclosure.

Referring to FIGS. 2, 6 and 7, the TCP data buffer TBF may include a transmit buffer TXB and a receive buffer RXB. The transmit buffer TXB may be a buffer storing the TCP data DTA that is to be transmitted by the data command "send( )". The receive buffer RXB may be a buffer storing the TCP data DTA that is to be received by the data command "recv( )".

The data command "recv( )" is a command to read a data that is to be received from the TCP data buffer TBF and to indicate that the read operation is complete. However, for the convenience of explanation, unless otherwise mentioned in the present disclosure, matters related to the data command "recv( )" should be understood as a concept that includes commands or events in a sequence of processes by which the application 121 obtains the TCP data DTA after the network interface device 140 receives the TCP packet from the remote device 200. For example, parameters or data in the present disclosure, which the network interface device 140 delivers to the host device 120 after processing the TCP packet received from the remote device 200, may also be described as the parameter PAR and the TCP data DTA.

The transmit buffer TXB and the receive buffer RXB may each include sub-buffer regions SRG separately allocated for a unique TCP session. FIG. 6 illustrates an example embodiment where the transmit buffer TXB and the receive buffer RXB include the sub-buffer regions SRGs for a first TCP session SID1 to a third TCP session SID3, respectively.

In this case, the identifiers "SID1", "SID2", and "SID3" that specify the different TCP sessions may be the flow IDs described above. When a new TCP session is generated, the TCP data buffer TBF may allocate new sub-buffer region SRG for the added TCP session. In addition, the TCP data buffer TBF may reclaim the sub-buffer region SRG allocated for a closed TCP session among the first to third TCP sessions SID1 to SID3.

Each sub-buffer region SRG may have a fixed size. Alternatively, the size of all or some of the sub-buffer regions SRGs may be variable. The former may facilitate operational control over the TCP data buffer TBF, while the latter may enhance flexibility in the design or operation of the server device 100. Alternatively, the size of the sub-buffer regions SRGs for at least two TCP sessions may vary while each sub-buffer region SRG has a fixed size. In this case, the server device 100 according to an example embodiment of the present disclosure may improve data processing performance despite the limited size of the TCP data buffer TBF by adaptively allocating the sub-buffer region SRG based on the characteristics of TCP sessions. For example, the server device 100 may allocate a relatively large sub-buffer region SRG to a TCP session with relatively high data throughput, such as OTT or AI computation.

The TCP data buffer TBF may be addressed corresponding to the sequence number of the TCP data DTA. For example, the address of the TCP data buffer TBF may be set to the value of the least significant bits of the sequence number of the TCP data DTA. In this case, the number of least significant bits of the sequence number used for the TCP data buffer TBF may correspond to the size of the sub-buffer region SRG of the TCP data buffer TBF. For example, when the size of the sub-buffer region SRG for the first TCP session SID1 is 64 KB, the address of the TCP data buffer TBF may be set with the 16 least significant bits of the sequence number.

In other words, the TCP data DTA according to the present disclosure may be stored in the region corresponding to the sequence numbers of the first data DTA1 of the TCP data buffer TBF.

For example, assume that the TCP data DTA is the data to be sent via the data command "send( )" for the first TCP session SID1, and the last sequence number of the TCP data DTA is "0x11112000". Further, assume that a data with the last sequence number "0x11111000" is written in the sub-buffer region SRG for the first TCP session SID1 of the transmit buffer TXB, within the TCP data buffer TBF. As described above, when the address of the TCP data buffer TBF is set with the 16 least significant bits of the TCP data DTA, a host processor (not illustrated) of the host device 120 may write the TCP data DTA in the region from "0x1001" to "0x2000" of the corresponding sub-buffer region SRG.

For example, assume that the TCP data DTA is the data to be received via the data command "recv( )" for the third TCP session SID3, and the last sequence number of the TCP data DTA is "0x12342300". Further, assume that a data with the last sequence number "0x12341500" is read out from the sub-buffer region SRG for the third TCP session SID3 of the receive buffer RXB, within the TCP data buffer TBF. As described above, when the address of the TCP data buffer TBF is set with the 16 least significant bits of the TCP data DTA, the TCP data DTA may be written in the region from "0x1501" to "0x2300" of the corresponding sub-buffer region SRG. The operation of writing the TCP data DTA to the receive buffer RXB may be performed as a direct memory access (DMA) operation of the network interface device 140. This will be discussed in more detail below.

In this case, the valid region of the TCP data buffer TBF for a particular TCP session, namely the region in which data is written, may be identified or set by a pair of transmit offsets TX_APP and TX_ACK or a pair of receive offsets RX_APP and RX_RCV.

In the example embodiment of FIG. 6, the first transmit offset TX_APP of the pair of transmit offsets TX_APP and TX_ACK may correspond to the last sequence number of the first data DTA1 most recently requested for transmission by the application 121, and the second transmit offset TX_ACK may correspond to the last sequence number of the TCP data DTA most recently acknowledged in response to an existing data transmission request by the application 121. In other words, it may be that the TCP data DTA with the last sequence number corresponding to the second transmit offset TX_ACK has been acknowledged.

The first receive offset RX_APP of the pair of receive offsets RX_APP and RX_RCV may correspond to the last sequence number of the TCP data DTA most recently read by the application 121, and the second receive offset RX_RCV may correspond to the last sequence number of the TCP data DTA most recently received from the network interface device 140.

In defining the transmit and receive offsets TX_APP, TX_ACK, RX_APP, and RX_RCV, the already processed TCP data DTA has been used as references, but it is not limited thereto. The transmit and receive offsets TX_APP, TX_ACK, RX_APP, and RX_RCV may also be defined based on the TCP data DTA to be newly processed. For example, the first transmit offset TX_APP may correspond to the first sequence number of the TCP data DTA that the application 121 is to transmit next, and the second transmit offset TX_ACK may correspond to the first sequence number of the TCP data DTA that needs to be ACK processed in the next sequence. Similarly, the first receive offset RX_APP may correspond to the first sequence number of the TCP data DTA that the application 121 is to read out next, and the second receive offset RX_RCV may correspond to the first sequence number of the TCP data DTA that needs to be ACK processed in the next sequence. However, for the convenience of explanation, the example embodiments concerning the transmit and receive offsets TX_APP, TX_ACK, RX_APP, and RX_RCV described later will be based on the already processed TCP data DTA.

In this manner, the second transmit offset TX_ACK and the first receive offset RX_APP may be updated after processing ACK for the transmission or reception of the TCP data DTA, respectively. This means that the TCP data DTA is stored in the TCP data buffer TBF until the transmission or reception of the TCP data DTA is complete, namely, until the corresponding ACK has been processed.

The TCP session table TTB according to an example embodiment of the present disclosure may indicate the state of the TCP data buffer TBF via the first transmit offset TX_APP, the second transmit offset TX_ACK, the first receive offset RX_APP, and the second receive offset RX_RCV for each of the TCP sessions SID1 to SID3.

First, the difference between the first transmit offset TX_APP and the second transmit offset TX_ACK may correspond to the size of the TCP data DTA, stored in the transmit buffer TXB, for the corresponding TCP session. When the address of the TCP data buffer TBF is set with 16 least significant bits of the TCP data DTA as described above, in the example embodiment of FIG. 6, the size of the TCP data DTA of the first TCP session SID1 currently stored in the transmit buffer TXB may be determined to be "0x1000", which corresponds to the difference between the first transmit offset TX_APP "0x2000" and the second transmit offset TX_ACK "0x1000".

In the same way, the difference between the first receive offset RX_APP and the second receive offset RX_RCV may correspond to the size of the TCP data DTA of the corresponding TCP session stored in the receive buffer RXB. When the address of the TCP data buffer TBF is set with 16 least significant bits of the TCP data DTA as described above, in the example embodiment of FIG. 6, the size of the TCP data DTA of the third TCP session SID3 currently stored in the receive buffer RXB may be determined to be "0xE00", which corresponds to the difference between the first receive offset RX_APP "0x1500" and the second receive offset RX_RCV "0x2300".

In addition, the first transmit offset TX_APP, the second transmit offset TX_ACK, the first receive offset RX_APP, and the second receive offset RX_RCV may change in value when the TCP data DTA is written to or read from the TCP data buffer TBF, and the updated state of the TCP data buffer TBF may be confirmed.

When the TCP data DTA is written to the TCP data buffer TBF or the TCP data DTA is read out by the host device 120, the first transmit offset TX_APP or the first receive offset RX_APP may be increased. In contrast, when the TCP data DTA in the TCP data buffer TBF is acknowledged or the TCP data DTA is written to the TCP data buffer TBF by the network interface device 140, the second transmit offset TX_ACK or the second receive offset RX_RCV may be increased.

For example, when the TCP data DTA with the last sequence number "0x11113000" for the first TCP session SID1 is newly stored in the transmit buffer TXB, the first transmit offset TX_APP may be increased to "0x3000". Alternatively, when the TCP data DTA with the last sequence number "0x12343000" for the third TCP session SID3 is newly stored in the receive buffer RXB, the second receive offset RX_RCV may be increased to "0x3000". In response to these changes in the first transmit offset TX_APP, second transmit offset TX_ACK, first receive offset RX_APP, and second receive offset RX_RCV, the TCP session table TTB may be updated.

Further, in addition to the information about the state of the TCP data buffer TBF, the TCP session table TTB may also store information about the state of each of the TCP sessions SID1 to SID3.

In the example embodiment of FIG. 7, the first entry of the TCP session table TTB may store a state of "Ready" for the first TCP session SID1, and the second entry may store a state of "Closed" for the second TCP session SID2. In addition, in the third entry of the TCP session table TTB, the state of "Ready" for the third TCP session SID3 may be stored. In the state of "Closed", the information about the TCP session may be deleted.

Referring again to FIGS. 2 and 5, the TOE library 122 may refer to the TCP session table TTB for the data command DCM related to the TOE socket (S540), and when there is sufficient space in the TCP data buffer TBF to write the TCP data DTA ("Yes" in S550), the TCP data DTA may be written into the TCP data buffer TBF in the aforementioned manner (S560). When there is not sufficient space in the TCP data buffer TBF ("No" in S550), the state of the TCP data buffer TBF is rechecked by referring to the TCP session table TTB again (S540). When space to write the TCP data DTA is not secured within a certain time, the corresponding data command DCM may be processed as timed out. However, it is not limited thereto, the data command DCM may also be processed for an immediate error without waiting for a certain time.

In other words, unlike the first path PH1 for the control command CCM, the second data path for the TCP data DTA of the data command DCM does not include the IPC block 124. Thus, the TCP data DTA of the data command DCM may be directly stored from the TOE library 122 to the TCP data buffer TBF, and transmitted to the network interface device 140 by DMA transfer. Therefore, the TCP data DTA of the data command DCM may be transmitted to the network interface device 140 without performing unnecessary data copy.

The second control path for the parameter PAR of the data command DCM, unlike the second data path, may include the IPC block 124 and the TCP session table TTB. The parameter PAR of the data command DCM, which includes information about the state of the TCP session and the sequence number of the TCP data DTA, may be written and updated in the TCP session table TTB by the TOE library 122. The IPC block 124 may periodically refer to the TCP session table TTB and transmit the information corresponding to the parameter PAR of the data command DCM to the network interface device 140. The method of transmitting the information of the TCP session table TTB to the network interface device 140 may be similar to the above-mentioned case for the control command CCM. For example, the IPC block 124 may transmit the information corresponding to the parameter PAR of the data command DCM to the network interface device 140 in the form of a command via a command queue or command ring implemented in a huge page.

In this manner, the data command DCM according to an example embodiment of the present disclosure may not be directly transmitted to the IPC block 124. In other words, both the second data path and the second control path of the data command DCM, namely the second path PH2 may be transmitted from the TOE library 122 to the shared memory 126, and the information related to the data command DCM may be shared with the IPC block 124. Therefore, the server device 100 according to an example embodiment of the present disclosure may perform optimized resource allocation and operation control for the data command DCM that is easy to store in memory and the control command CCM that is not. However, it is not limited thereto. As needed, the parameters PAR of the data command DCM according to an example embodiment of the present disclosure may be transmitted from the TOE library 122 to the IPC block 124 for processing, as similar to the control command CCM.

Accordingly, the server device 100 and its operating method according to an example embodiment of the present disclosure may reduce system resources used within the host device 120 and improve operational efficiency by performing optimal processing for both the control path (the first path PH1) and the data path (the second path PH2). In this case, the TOE library 122 and the IPC block 124 may check the state changes of the TCP data buffer TBF through the shared memory 126, thus enabling accurate data processing.

Furthermore, the server device 100 and its operating method according to an example embodiment of the present disclosure allow for efficient operation by identifying the areas of the TCP data buffer TBF that need to be accessed, even if only the sequence number of the TCP data DTA is shared during communication between the host device 120 and the network interface device 140.

Additionally, the server device 100 and its operating method according to an example embodiment of the present disclosure may manage the entire TCP sessions SID1 to SID3 of the server device 100 by sharing the TCP session table, which stores state information for all TCP sessions SID1 to SID3, between the TOE library 122 and the IPC block 124.

Furthermore, according to an example embodiment of the present disclosure, the server device 100 and its operating method allow each application to call the corresponding TOE library 122, and each TOE library 122 may operate independently, similar to an application thread. In this case, a plurality of the applications 121 may share the shared memory 126 and the IPC block 124. Therefore, even when the plurality of the applications 121 simultaneously access the network interface device 140, the IPC block 124 may orchestrate these concurrent or parallel requests.

In the above, the case where the control command CCM and the data command DCM are transmitted from the host device 120 to the network interface device 140 has mainly described. However, in the opposite case, that is, the operation of transmitting commands and data corresponding to the control command CCM and the data command DCM from the network interface device 140 to the host device 120, may also be performed in the same manner. For example, the network interface device 140 may DMA transfer data to the TCP data buffer TBF, and the corresponding information may be updated in the TCP session table TTB through the IPC block 124.

Although not shown, the network interface device 140 may also include a table that stores offsets for the TCP data buffer TBF, similar to the TCP session table TTB of the host device 120, and may reference the table during operations for DMA transfer or DMA receive.

Figure 8:
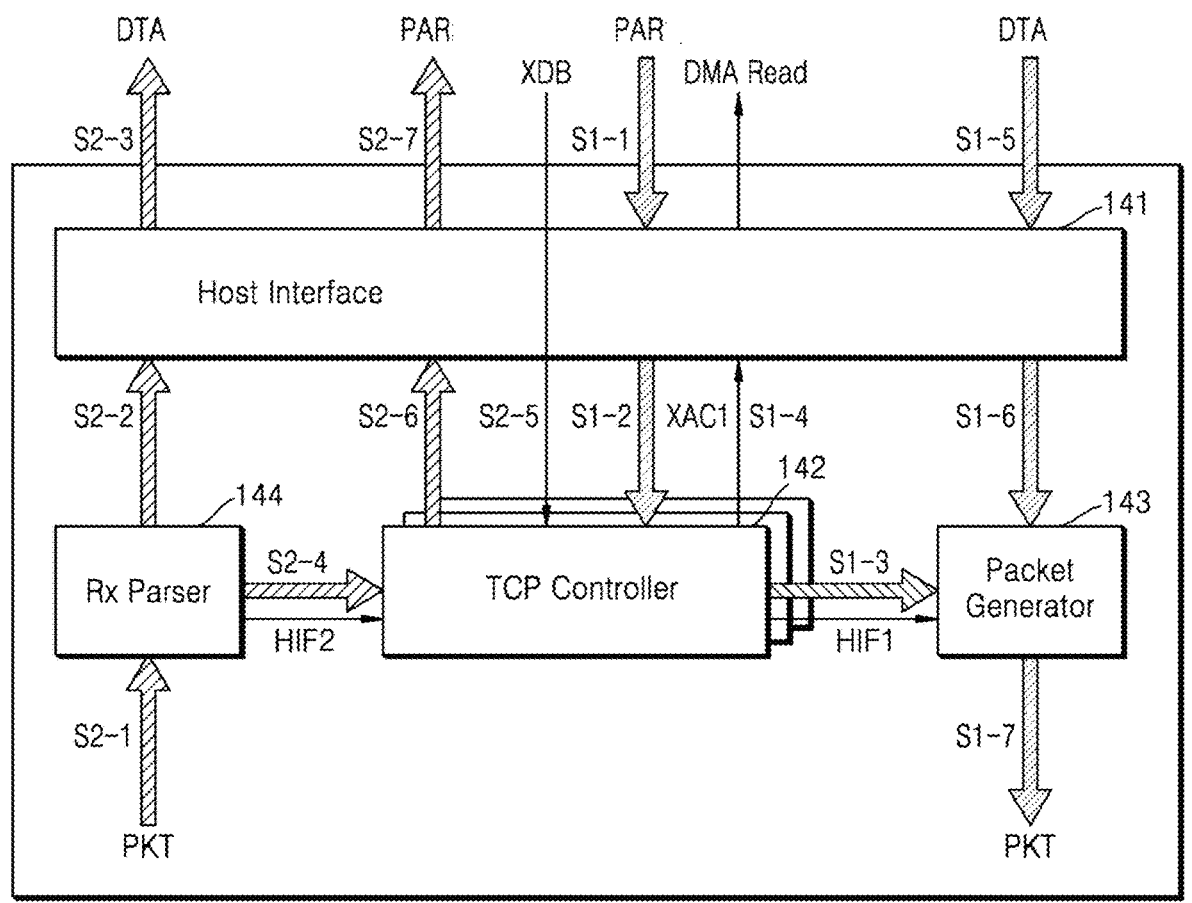
FIG. 8 is a diagram illustrating a network interface device, according to an example embodiment of the present disclosure.

FIG. 8 is a diagram illustrating a network interface device 140 according to an example embodiment of the present disclosure.

Referring to FIGS. 2 and 8, the network interface device 140 according to an example embodiment of the present disclosure may generate the TCP packet PKT by receiving the parameter PAR and the TCP data DTA from the host device 120, or may deliver the parameter PAR and the TCP data DTA to the host device 120 by receiving the TCP packet TPK from the network. The network interface device 140 according to an example embodiment of the present disclosure may be a smart network interface card based on a field-programmable gate array (FPGA), an application-specific integrated circuit (ASIC), or a system on chip (SoC).

The network interface device 140, according to an example embodiment of the present disclosure, may comprise a host interface 141, a TCP controller 142, a packet generator 143, and a receive parser 144.

The host interface 141 may perform an interface with the host device 120. Specifically, the host interface 141 may receive the parameter PAR and the TCP data DTA from the host device 120, and transmit the parameter PAR and the TCP data DTA to the host device 120. In this case, the host interface 141 may include a DMA controller to perform the transmission and reception of parameters and data to and from the host device 120 by way of DMA.

The TCP controller 142 may generate a first header information HIF1 by performing TCP operations for the parameter PAR received from the host device 120, and may generate the parameter PAR by performing TCP operations for a second header information HIF2 extracted from the TCP packet TPK received from the network.

The packet generator 143 may generate the TCP packet TPK by combining the TCP header corresponding to the first header information HIF1 and the payload corresponding to the TCP data DTA provided from the TCP controller 142. The receive parser 144 may deliver the second header information HIF2 corresponding to the TCP header to the TCP controller 142 by parsing the TCP packet TPK received from the network and deliver the payload as the TCP data DTA to the host device 120 via the host interface 141.

As described above, the network interface device 140 according to an example embodiment of the present disclosure may operate efficiently because it knows where to access the TCP data buffer TBF even if it only shares a sequence number of the TCP data DTA with the host device 120. In addition, since the network interface device 140 according to an example embodiment of the present disclosure receives or transmits the TCP data DTA by way of DMA, it may perform TCP operations independently and asynchronously from the host device 120. Thus, the network interface device 140 according to an example embodiment of the present disclosure, high-performance TOE operations may be supported while minimizing the burden on the host CPU.

Further, the network interface device 140 according to an example embodiment of the present disclosure may not have or use an internal buffer for buffering the TCP data DTA of the host device 120. In order to ensure the reliability of TCP communication even in the event that the TCP packet TPK is lost or the order of the TCP packet TPK is changed in the network, it is required to buffer the data transmitted by the transmitting device of the TCP packet TPK until the server device 100 or the remote device 200 of FIG. 1 acknowledges the reception of the TCP packet TPK.

The network interface device 140 according to an example embodiment of the present disclosure may perform TCP operation using the TCP data DTA stored in the TCP data buffer TBF of the host device 120. In this case, as described above, since the TCP data DTA is written starting from the first transmit offset TX_APP and the second receive offset RX_RCV, the TCP data DTA may be stored in the TCP data buffer TBF until it is acknowledged.

Thus, the network interface device 140 according to an example embodiment of the present disclosure may perform TCP operation without copying the TCP data DTA in the TCP data buffer TBF back to an internal buffer. This will be described in detail below.

The host interface 141 may receive the data command "send( )" including the parameter PAR (S1-1) and deliver including the parameter PAR to the TCP controller 142 (S1-2). The TCP controller 142 may deliver the first header information HIF1 to the packet generator 143 by performing TCP operation (S1-3).

Additionally, a first access signal XAC1 is transmitted to the host interface 141, and the host interface 141 may perform a DMA reception (reading out) into the TCP data buffer TBF in response to the first access signal XAC1 (S1-4). The first access signal XAC1 may include a sequence number of the TCP data DTA or an address of the TCP data buffer TBF corresponding to the sequence number of the TCP data DTA.

FIG. 8 illustrates an example embodiment for the TCP controller 142 that outputs the first access signal XAC1 simultaneously with the generation of the first header information HIF1 or after the generation of the first header information HIF1, in order to facilitate and simplify the combining of the first header information HIF1 corresponding to the TCP header and the payload corresponding to the TCP data DTA by the passively operating packet generator 143. However, it is not limited thereto. According to an example embodiment of the present disclosure, the packet generator 143 may also transmit the first access signal XAC1 to the host interface 141, after receiving the first header information HIF1.

The host interface 141 may perform a DMA reception of the TCP data DTA stored in the region of the TCP data buffer TBF corresponding to the first access signal (S1-5). The TCP data DTA received on the host interface 141 may be delivered to the packet generator 143 without further copy inside the network interface device 140 (S1-6).

Figure 9:
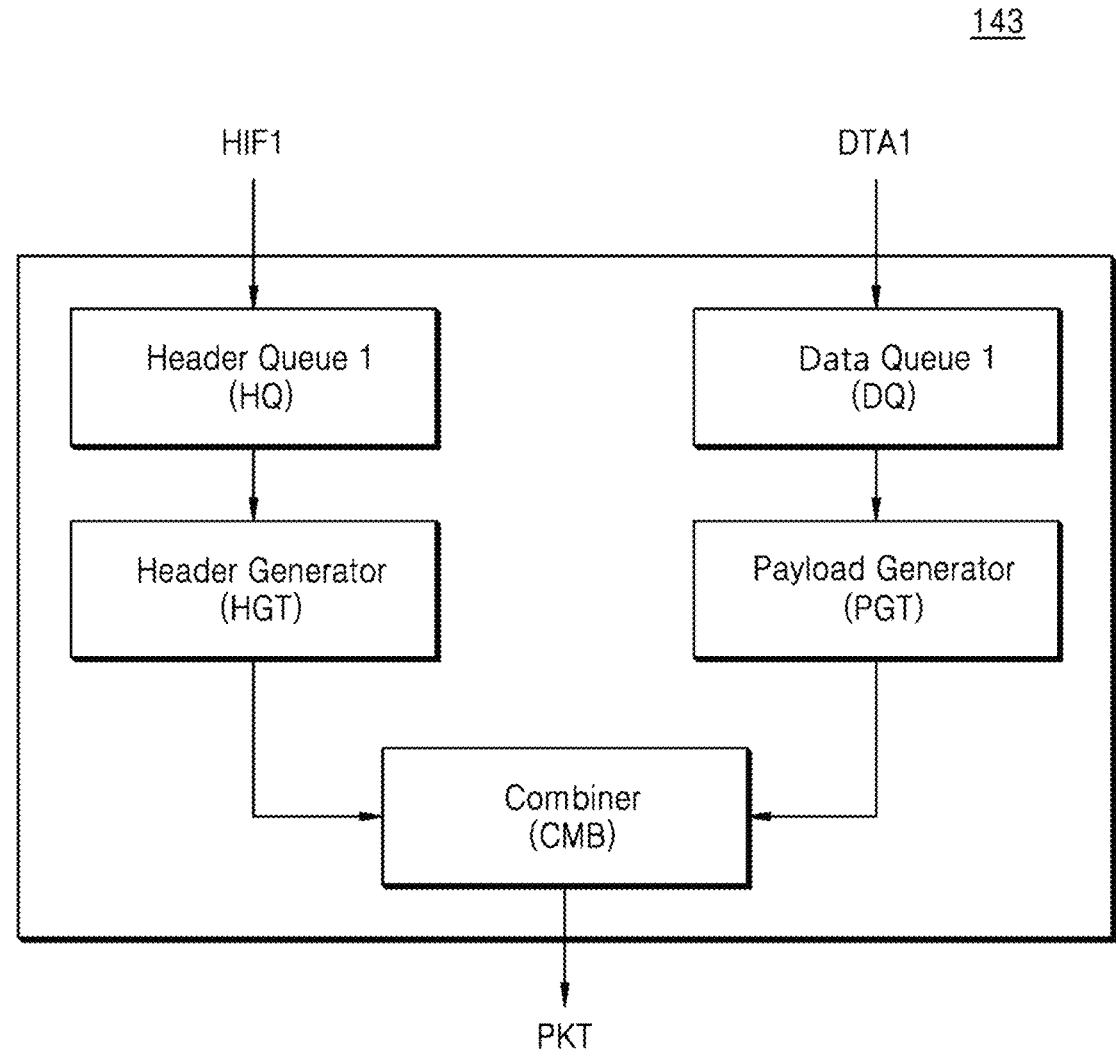
FIG. 9 is a diagram illustrating a packet generator, according to an example embodiment of the present disclosure.

FIG. 9 is a diagram illustrating the packet generator 143, according to an example embodiment of the present disclosure.

Referring to FIGS. 2, 8, and 9, the packet generator 143 according to an example embodiment of the present disclosure may include a first header queue HQ1, a first data queue DQ1, a header generator HGT, a data generator DGT, and a combiner CMB.

The first header queue HQ1 may receive the first header information HIF1 from the TCP controller 142. The first data queue DQ1 may receive the TCP data DTA from the host interface 141. As described above, by coordinating the generation of the first header information HIF1 and the output of the first access signal XAC1 by the TCP controller 142, the first header information HIF1 and the TCP data DTA may be located at the same location (same index) in the first header queue HQ1 and the first data queue DQ1 without performing additional control.

The header generator HGT may generate a TCP header corresponding to the first header information HIF1 based on the TCP protocol. The payload generator PGT may generate a payload corresponding to the TCP data DTA. In this case, the sequence number for the TCP data DTA included in the parameter PAR described above may be the same or different from the sequence number in the TCP header of the TCP packet PKT. In the same manner, the size of the TCP data DTA and the size of the payload may be the same or different. For example, the network interface device 140 may generate the TCP packet TPK with a size of the payload different from the TCP data DTA of the data command DCM based on system resources or network conditions, and the sequence number in the TCP header may be set differently from the sequence number in the parameter PAR.

The combiner CMB may combine the TCP header and the payload to generate the TCP packet TPK.

Therefore, the network interface device 140 according to an example embodiment of the present disclosure may process the TCP data DTA received at the host interface 141 as the TCP packet TPK without performing any additional buffering operation on the TCP data DTA and directly deliver it to the packet generator 143. Thus, memory usage in the network interface device 140 may be significantly reduced.

Referring again to FIGS. 2 and 8, the first data DTA1 is not copied internally in the network interface device 140, so that when the TCP packet TPK generated by the packet generator 143 is transmitted to the network, the TCP data DT1 no longer exists in the network interface device 140. In this case, "no longer exist" means that the network interface device 140 does not intentionally store or buffer the TCP data DTA of the TCP packet TPK internally for any processing or purpose after the transmission of the TCP packet TPK, and does not mean that it includes unintentional storage state which may happen on most computing systems.

The network interface device 140 according to an example embodiment of the present disclosure may generate the TCP packet PKT via the above operations. In addition, the network interface device 140 according to an example embodiment of the present disclosure may process the TCP packet PKT received over the network as follows.

When the receive parser 144 receives the TCP packet PKT from the network (S2-1), it may deliver the TCP data DTA corresponding to the payload of the TCP packet PKT to the host interface 141 (S2-2) to perform a DMA transmission (writing) to the TCP data buffer TBF (S2-3). In this case, the TCP data DTA may be stored in an area of the TCP data buffer TBF corresponding to a sequence number of the packet data PDT. As described above, the TCP data DTA may be generated in a size different the payload.

Simultaneously, the receive parser 144 may deliver the second header information HIF2 of the received TCP packet PKT to the TCP controller 142 (S2-4), and the TCP controller 142 may perform TCP operation on it to generate the parameter PAR. After that, when a request for receiving the TCP data DTA from the host device 120, such as a doorbell signal XDB, is received (S2-5), the data command DCM including the parameter PAR may be delivered to the host device 120 (S2-6, S2-7). In this case, as described above, the TCP controller 142 may first deliver the data command to the host device 120 before receiving the doorbell signal XDB (S2-6).

Just as the TCP data DTA no longer exists in the network interface device 140 when the TCP packet TPK generated by the packet generator 143 is transmitted to the network, the TCP data DTA no longer exists in the network interface device 140 when the TCP data DTA is transmitted to the host device 120 via the host interface 141. In this case, the meaning of 'does not exist' is also as described above.

In this manner, the network interface device 140 according to an example embodiment of the present disclosure may process the TCP packets TPK by delivering the TCP data DTA directly to the host interface 141 without performing additional buffering operation, where the second data DTA2 is processed by the receive parser 144. Thus, memory usage in the network interface device 140 may be significantly reduced.

Although not shown, the network interface device 140 according to an example embodiment of the present disclosure may further include a scheduler, internal memory, and the like. In addition, the network interface device 140 according to an example embodiment of the present disclosure may further include separate modules for supporting other network protocols other than TCP/IP, such as Internet Control Message Protocol (ICMP), Address Resolution Protocol (ARP), and the like, and may perform link layer routing, and the like, through such processing modules.

According to an example embodiment of the present disclosure, a server device may include a host device configured to hook a control command and a data command to a TCP/IP Offload Engine (TOE) library, process the control command through a first path, and process the dada command through a second path that is different from the first path and shares information for a TCP session with the first path, and a TOE-based network interface device configured to receive the control command and the data command, and generate a TCP packet by performing a TCP operation.

According to an example embodiment of the present disclosure, the first path may include an Inter-Process Communication (IPC) block.

According to an example embodiment of the present disclosure, the control command may be configured to transmitted from the TOE library to the IPC block in the form of a Remote Procedure Call (RPC) message.

According to an example embodiment of the present disclosure, the host device may further include a TCP data buffer configured to store a TCP data of the data command in a region corresponding to a sequence number of the TCP data, and a TCP session table shared by the TOE library and the IPC block, and configured to store information about the state of the TCP session and the state of the TCP data buffer.

According to an example embodiment of the present disclosure, the TCP session table may include a flow identifier (ID), a first transmit offset, a second transmit offset, a first receive offset, and a second receive offset, as information concerning the state of the TCP data buffer.

According to an example embodiment of the present disclosure, a size of the TCP data stored in the TCP data buffer for a single flow ID may be equal to the difference between the first transmit offset and the second transmit offset, or the difference between the first receive offset and the second receive offset.

According to an example embodiment of the present disclosure, the TCP session table may store information about the state of the TCP session and of the state of the TCP data buffer in the server device.

According to an example embodiment of the present disclosure, the TOE-based network interface device may include a host interface configured to receive the sequence number of the TCP data from the IPC block, and receive the TCP data from the region corresponding to the sequence number in the TCP data buffer by way of Direct Memory Access (DMA).

According to an example embodiment of the present disclosure, the data command may be not transmitted to the IPC block.

According to an example embodiment of the present disclosure, the host device may further include a shared memory shared by the first path and the second path, and configured to store information about the TCP session.

According to an example embodiment of the present disclosure, the shared memory and the IPC block may be shared among a plurality of applications of the host device.

According to an example embodiment of the present disclosure, the TOE-based network interface device may not include an internal buffer that stores the TCP data of the data command received by way of DMA from the host device until before ACK processing.

According to an example embodiment of the present disclosure, a TOE-based network interface device may be configured to receive the control command and the data command, and generate a TCP packet by performing a TCP operation.

According to an example embodiment of the present disclosure, an operating method of a server device may include hooking a control command and a data command by a TOE library of the server device, processing the control command through a first path by a host processor of the server device, processing the data command through a second path that is different from the first path and shares information for a TCP session with the first path by the host processor and receiving the control command and the data command, and generating a TCP packet through performing a TCP operation by a TOE-based network interface device.

According to an example embodiment of the present disclosure, the processing the control command through the first path may include transmitting the control command, converted into the form of an RPC message, to an IPC block, by the TOE library.

According to an example embodiment of the present disclosure, the processing the data command through the second path may include storing a TCP data of the data command in a TCP data buffer by the TOE library, and updating a TCP session table with an offset indicating the state in which the TCP data is stored in the TCP data buffer by the IPC block.

According to an example embodiment of the present disclosure, the TCP session table may be shared by the TOE library and the IPC block.

According to an example embodiment of the present disclosure, the storing a TCP data in the TCP data buffer may include storing the TCP data in a region of the TCP data buffer corresponding to a sequence number of the TCP data, by the TOE library.

According to an example embodiment of the present disclosure, the storing a TCP data in the TCP data buffer may further include checking whether there is space available in the TCP data buffer for storing the TCP data by referencing a first transmit offset and a second transmit offset of the TCP session table, before storing the TCP data in the TCP data buffer, by the TOE library.

According to an example embodiment of the present disclosure, the generating a TCP packet through performing a TCP operation may include receiving a parameter of the data command including a sequence number of the TCP data from the host device by the TOE-based network interface device, and receiving the TCP data by way of DMA from a region corresponding to the sequence number in the TCP data buffer.

The various embodiments and terms used herein are not intended to limit the technical features described herein to specific embodiments and should be understood to include various modifications, equivalents, or substitutes of the example embodiments. For example, an element expressed in a singular should be understood as a concept including a plurality of elements unless the context clearly refers only the singular. It should be understood that the term 'and/or' as used herein is intended to encompass any and all possible combinations of one or more of the enumerated items. As used in the present disclosure, the terms such as 'comprise (s)', 'include(s)' 'have/has', 'configured of', etc. are only intended to designate that the features, components, parts, or combinations thereof described in the present disclosure exist, and the use of these terms is not intended to exclude the possibility of the presence or addition of one or more other features, components, parts, or combinations thereof. In the present disclosure, each of the phrases such as "A or B", "at least one of A and B", "at least one of A or B", "A, B or C", "at least one of A, B and C", and "at least one of A, B, or C" may include any one of the items enumerated together in a corresponding one of the phrases, or all possible combinations thereof. Terms such as "the first", "the second", or "first", or "second" may be used simply to distinguish a corresponding component from another corresponding component, and do not limit the corresponding components in view of other aspect (e.g., importance or order).

The term "unit", "block" or "module" used in various embodiments of the present disclosure may include a unit implemented in hardware, software, or firmware, or any combination thereof, and be used interchangeably with terms such as e.g., logic, logic block, part, component, or circuitry, for example. The unit, block or module may be a minimum unit or a part of the integrally configured component or the component that performs one or more functions. For example, according to an example embodiment, the unit, block or module may be implemented in the form of an ASIC or a FPGA.

The term "in case ~" used in various embodiments of the present disclosure, may be construed to refer, for example, to "when ~", or "in response to determining ~" or "in response to detecting ~", depending on the context. Similarly, the term "when it is determined that ~" or "when it is detected that ~" may be interpreted to refer, for example, to "upon determining ~" or "in response to determining ~", or "upon detecting ~" or "in response to detecting ~", depending on the context.

The program executed by the TOE-based network interface device 140 and the server device 100 described herein may be implemented as a hardware component, a software component, and/or a combination of the hardware component and the software component. The program may be executed by any system capable of executing computer readable instructions.

Software may include a computer program, codes, instructions, or a combination of one or more of these, and may configure a processing unit to perform operations as desired or command the processing unit independently or in combination (collectively). The software may be implemented as a computer program including instructions stored in a computer-readable storage medium. The computer-readable storage medium may include, for example, a magnetic storage medium (e.g., read-only memory (ROM), random-access memory (RAM), floppy disk, hard disk, and so on), an optically readable medium (e.g., CD-ROM, digital versatile disc (DVD), or the like) and so on. The computer-readable storage medium may be distributed among network-connected computer systems, so that the computer-readable code may be stored and executed in a distributed manner. The computer program may be distributed (e.g., downloaded or uploaded) by online, either via an application store (e.g. Play Store™) or directly between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

According to various embodiments, each component (e.g., module or program) of the above-described components may include a singular or a plurality of entities, and some of the plurality of entities may be separated and placed into other components. According to various embodiments, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly or heuristically, or one or more of the operations may be executed in a different order or omitted, or one or more other operations may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the example embodiment(s) described herein may be used in conjunction with any other example embodiment(s) described herein.

What is claimed is:

1. A server device comprising:
a host device configured to hook a control command and a data command to a TCP/IP Offload Engine (TOE) library, process the control command through a first path including an Inter-Process Communication (IPC) block, and process the data command through a second path that is different from the first path and shares information for a TCP session with the first path; and
a TOE-based network interface device configured to receive the control command and the data command, and generate a TCP packet by performing a TCP operation,
wherein the IPC block is configured to check or update state of the TCP session based on the control command,
wherein the TOE library is configured to reference the TCP session and write TCP data of the data command directly to a TCP data buffer, thereby bypassing the IPC block, and
wherein the host device further comprises:
the TCP data buffer configured to store the TCP data of the data command in a region corresponding to a sequence number of the TCP data; and
a TCP session table shared by the TOE library and the IPC block, and configured to store information about the state of the TCP session and the state of the TCP data buffer.

2. The server device of claim 1, wherein the control command is configured to be transmitted from the TOE library to the IPC block in the form of a Remote Procedure Call (RPC) message.

3. The server device of claim 1, wherein the TCP session table comprises a flow identifier (ID), a first transmit offset, a second transmit offset, a first receive offset, and a second receive offset, as information concerning the state of the TCP data buffer.

4. The server device of claim 3, wherein a size of the TCP data stored in the TCP data buffer for a single flow ID is equal to the difference between the first transmit offset and the second transmit offset, or the difference between the first receive offset and the second receive offset.

5. The server device of claim 1, wherein the TCP session table stores information about the state of the TCP session and of the state of the TCP data buffer in the server device.

6. The server device of claim 1, wherein the TOE-based network interface device comprises a host interface configured to receive the sequence number of the TCP data from the IPC block, and receive the TCP data from the region corresponding to the sequence number in the TCP data buffer by way of Direct Memory Access (DMA).

7. The server device of claim 1, wherein the host device further comprises a shared memory shared by the first path and the second path, and configured to store information about the TCP session.

8. The server device of claim 7, wherein the shared memory and the IPC block are shared among a plurality of applications of the host device.

9. The server device of claim 1, wherein the TOE-based network interface device does not include an internal buffer that stores the TCP data of the data command received by way of DMA from the host device until before ACK processing.

10. A TOE-based network interface device of claim 1.

11. An operating method of a server device, the method comprising:

hooking a control command and a data command, by a TOE library of the server device;

processing the control command through a first path including an Inter-Process Communication (IPC) block, by a host processor of the server device;

processing the data command through a second path that is different from the first path and shares information for a TCP session with the first path, by the host processor; and receiving the control command and the data command, and generating a TCP packet through performing a TCP operation, by a TOE-based network interface device, wherein the processing of the control command comprises checking or updating state of the TCP session based on the control command, wherein the processing of the data command comprises referencing the TCP session and writing TCP data of the data command directly to a TCP data buffer, thereby bypassing the IPC block, and wherein the processing of the data command further comprises:

storing the TCP data of the data command in a region of the TCP data buffer corresponding to a sequence number of the TCP data, by the TOE library; and updating a TCP session table shared by the TOE library and the IPC block with an offset indicating the state in which the TCP data is stored in the TCP data buffer, by the IPC block.

12. The method of claim 11, wherein the processing the control command through the first path comprises:

transmitting the control command, converted into the form of an RPC message, to the IPC block, by the TOE library.

13. The method of claim 11, wherein the TCP session table is shared by the TOE library and the IPC block.

14. The method of claim 11, wherein the storing a TCP data in the TCP data buffer further comprises:

checking whether there is space available in the TCP data buffer for storing the TCP data by referencing a first transmit offset and a second transmit offset of the TCP session table, before storing the TCP data in the TCP data buffer, by the TOE library.

15. The method of claim 11, wherein the generating a TCP packet through performing a TCP operation comprises:

receiving a parameter of the data command including a sequence number of the TCP data from the host device, by the TOE-based network interface device; and receiving the TCP data by way of DMA from a region corresponding to the sequence number in the TCP data buffer, by the TOE-based network interface device.

* * * * *